(12) United States Patent
Kataoka

(10) Patent No.: US 6,478,742 B1
(45) Date of Patent: Nov. 12, 2002

(54) PRF ADJUSTMENT METHOD AND APPARATUS, AND ULTRASONIC WAVE IMAGING APPARATUS

(75) Inventor: Hiroaki Kataoka, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/685,817

(22) Filed: Oct. 10, 2000

(30) Foreign Application Priority Data

Nov. 5, 1999 (JP) ............................. 11-314614

(51) Int. Cl.[7] ............................................. A61B 8/00
(52) U.S. Cl. ...................................... 600/449; 600/455
(58) Field of Search ................................. 600/458, 454, 600/455, 443, 447, 449, 456, 448

(56) References Cited

U.S. PATENT DOCUMENTS

| | | | |
|---|---|---|---|
| 4,785,402 A | | 11/1988 | Matsuo |
| 5,377,684 A | | 1/1995 | Hara |
| 5,458,129 A | * | 10/1995 | Wheeler et al. ............ 600/454 |
| 5,474,073 A | | 12/1995 | Schwartz |
| 5,482,046 A | * | 1/1996 | Deitrich ...................... 600/458 |
| 5,544,658 A | * | 8/1996 | Kim et al. ................... 600/454 |
| 5,628,321 A | * | 5/1997 | Schieb et al. ............... 600/454 |
| 5,709,209 A | * | 1/1998 | Friemel et al. ............. 600/443 |

FOREIGN PATENT DOCUMENTS

| | | |
|---|---|---|
| JP | 62106746 | 5/1987 |
| JP | 2309934 | 12/1990 |
| JP | 3039148 | 2/1991 |
| JP | 5095947 | 4/1993 |
| JP | 8229038 | 9/1996 |
| JP | 1014918 | 1/1998 |

* cited by examiner

Primary Examiner—Francis J. Jaworski
Assistant Examiner—Maulin Patel
(74) Attorney, Agent, or Firm—Moonray Kojima

(57) ABSTRACT

In order to obtain an optimum PRF, the velocity distribution of an echo source is calculated based on the Doppler shift of an ultrasonic wave echo, the profile of the velocity distribution is calculated (172), the reflection of the profile is corrected (174), the maximum value of the velocity in the corrected profile is detected (176), and the PRF of the ultrasonic wave transmission is adjusted based thereon (178).

32 Claims, 13 Drawing Sheets

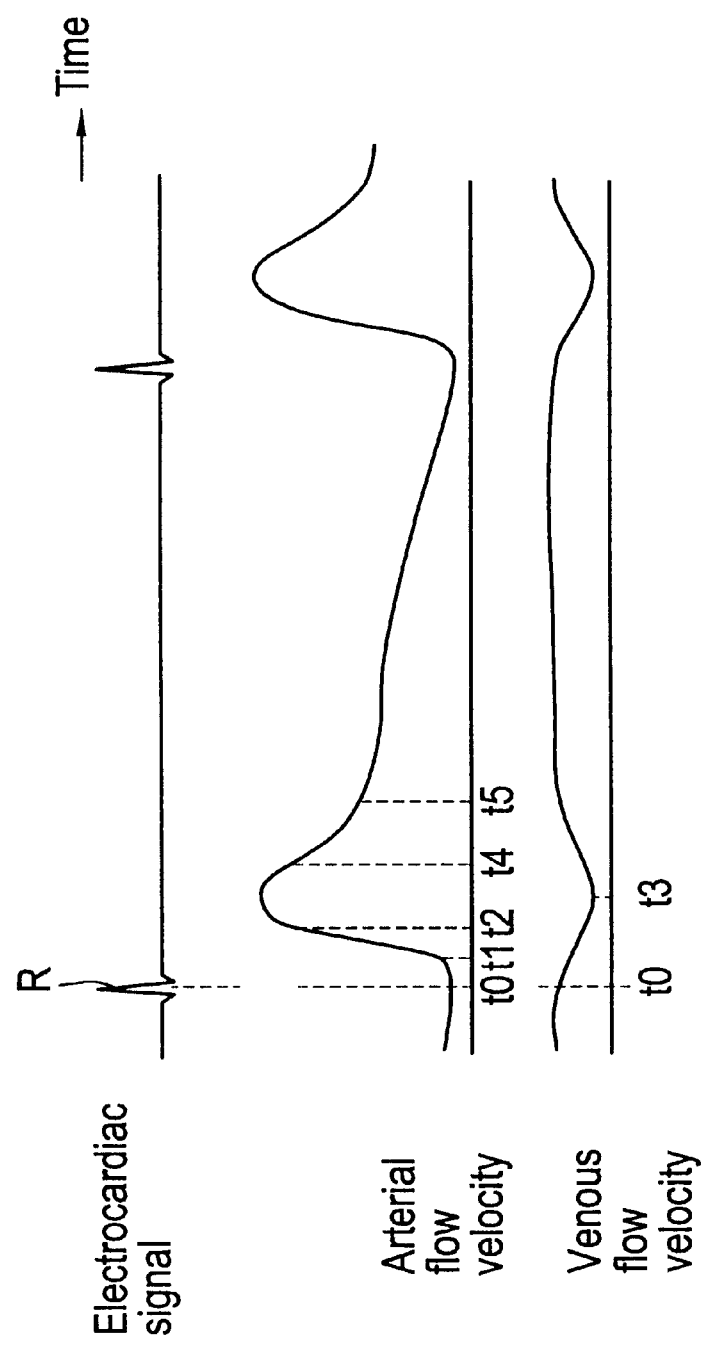

PRF ADJUSTMENT METHOD AND APPARATUS, AND ULTRASONIC WAVE IMAGING APPARATUS

BACKGROUND OF THE INVENTION

This invention relates to a PRF adjustment method and apparatus, an ultrasonic wave imaging apparatus, and in particular, to a method and apparatus for adjusting the PRF (pulse repetition frequency) when an image is acquired based on the Doppler shift of an ultrasonic wave echo, and an ultrasonic imaging apparatus comprising a PRF adjustment apparatus.

In ultrasonic wave imaging, a blood flow image or the like is acquired using the Doppler shift of an echo received from a repetitively transmitted ultrasonic wave. The blood flow is displayed as a CFM (Colour Flow Mapping) image showing a two-dimensional distribution of blood flow velocity, a DPDI (Directional Power Doppler Imaging) image showing the presence of the blood flow together with its direction, or a PFD (Pulsatile Flow Detection) image showing a two-dimensional distribution of the pulsation intensity of the blood flow.

To obtain a CFM image, DPDI image or PFD image conveniently, a repetition frequency of a transmitted ultrasonic wave, i.e., a PRF, must be appropriately set, however there was no technique for automating the setting of an optimum PRF, so an operator had to perform the setting by trial and error.

SUMMARY OF THE INVENTION

It is an object of this invention to provide a PRF adjustment method and apparatus for obtaining an optimum PRF, and to provide an ultrasonic wave imaging apparatus comprising such a PRF adjustment apparatus.

The invention from a first aspect for resolving the above problem is a PRF adjustment method comprising the steps of calculating the velocity distribution of an echo source based on the Doppler shift of an echo received from a repetitively transmitted ultrasonic wave, calculating the profile of said velocity distribution, correcting the reflection of said profile, detecting the maximum value of the velocity in the corrected profile, and adjusting the repetition frequency of ultrasonic wave transmission based on the maximum value. [0006]

In the invention from this aspect, the PRF is adjusted based on the maximum value of the velocity distribution profile in which reflection is corrected. In this way, the PRF is automatically adjusted according to the maximum velocity.

The invention from another aspect for resolving the above problem is a PRF adjustment apparatus, comprising a velocity distribution calculating means which calculates the velocity distribution of an echo source based on the Doppler shift of an echo received from a repetitively transmitted ultrasonic wave, a profile calculating means which calculates the profile of the velocity distribution, a reflection correcting means which corrects the reflection of the profile, a maximum value detecting means which detects the maximum value of the velocity in the corrected profile, and a repetition frequency adjusting means which adjusts the repetition frequency of the ultrasonic wave based on the maximum value.

In the invention from this aspect, the PRF is adjusted by a reflection frequency adjusting means based on the maximum value of the velocity distribution profile in which the reflection is corrected. In this way, the PRF is automatically adjusted according to the maximum velocity.

The invention from another aspect for resolving the above problem is an ultrasonic wave imaging apparatus, comprising a velocity distribution calculating means which calculates the velocity distribution of an echo source based on the Doppler shift of an echo received from a repetitively transmitted ultrasonic wave, a profile calculating means which calculates the profile of the velocity distribution, a reflection correcting means which corrects the reflection of the profile, a maximum value detecting means which detects the maximum value of the velocity in the corrected profile, a repetition frequency adjusting means which adjusts the repetition frequency of the ultrasonic wave based on the maximum value, and a display means which displays the velocity distribution as an image.

In the invention from this aspect, the PRF is adjusted by the reflection frequency adjusting means based on the maximum value of the velocity distribution profile in which the reflection is corrected. In this way, the PRF is automatically adjusted according to the maximum velocity. A velocity distribution image acquired by this PRF is displayed by the display means. Hence, an appropriate CFM image can be obtained.

The invention from another aspect for resolving the above problem is an ultrasonic wave imaging apparatus, comprising a power distribution calculating means which calculates a power distribution of a Doppler signal based on the Doppler shift of an echo received from a repetitively transmitted ultrasonic wave, a velocity distribution calculating means which calculates the velocity distribution of an echo source based on the Doppler shift of the echo received from the repetitively transmitted ultrasonic wave, a calculating means which calculates the profile of the velocity distribution, a reflection correcting means which corrects the reflection of the profile, a maximum value detecting means which detects the maximum value of the velocity in the corrected profile, a repetition frequency adjusting means which adjusts the repetition frequency of the ultrasonic wave based on the maximum value, and a display means which displays the power distribution as an image.

In the invention from this aspect, the PRF is adjusted by the reflection frequency adjusting means based on the maximum value of the velocity distribution profile in which the reflection is corrected. A power distribution image acquired by this PRF is displayed by the display means. Hence, an appropriate DPDI image can be obtained.

The invention from another aspect for resolving the above problem is an ultrasonic wave imaging apparatus, comprising a pulsation intensity distribution calculating means which calculates a pulsation intensity distribution of an echo source based on the Doppler shift of an echo received from a repetitively transmitted ultrasonic wave, a velocity distribution calculating means which calculates the velocity distribution of the echo source based on the Doppler shift of the echo received from the repetitively transmitted ultrasonic wave, a calculating means which calculates the profile of the velocity distribution, a reflection correcting means which corrects the reflection of the profile, a maximum value detecting means which detects the maximum value of the velocity in the corrected profile, a repetition frequency adjusting means which adjusts the repetition frequency of the ultrasonic wave based on the maximum value, and a display means which displays the pulsation intensity distribution as an image.

In the invention from this aspect, the PRF is adjusted by the reflection frequency adjusting means based on the maximum value of the velocity distribution profile in which the reflection is corrected. In this way, the PRF is automatically adjusted according to the maximum velocity. The pulsation distribution image acquired by this PRF is displayed by the display means. Hence, an appropriate PFD image can be obtained.

The invention from another aspect for resolving the above problem is an ultrasonic wave imaging method comprising the steps of calculating the velocity distribution of an echo source based on the Doppler shift of an echo received from a repetitively transmitted ultrasonic wave, calculating the profile of the velocity distribution, correcting the reflection of the profile, detecting the maximum value of the velocity in the corrected profile, adjusting the repetition frequency of ultrasonic wave transmission based on the maximum value, and displaying the velocity distribution as an image.

In the invention from this aspect, the PRF is adjusted based on the maximum value of the velocity distribution profile in which the reflection is corrected. In this way, the PRF is automatically adjusted according to the maximum velocity. A velocity distribution image acquired by this PRF is displayed. Hence, an appropriate CFM image can be obtained.

The invention from another aspect for resolving the above problem is an ultrasonic wave imaging method, comprising the steps of calculating a power distribution of a Doppler signal based on the Doppler shift of an echo received from a repetitively transmitted ultrasonic wave, calculating the velocity distribution of an echo source based on the Doppler shift of the echo received from the repetitively transmitted ultrasonic wave, calculating the profile of the velocity distribution, correcting the reflection of the profile, detecting the maximum value of the velocity in the corrected profile, adjusting the repetition frequency of the ultrasonic wave based on the maximum value, and displaying the power distribution as an image.

In the invention from this,aspect, the PRF is adjusted based on the maximum value of the velocity distribution profile in which the reflection is corrected. In this way, the PRF is automatically adjusted according to the maximum velocity. A power distribution image acquired by this PRF is displayed. Hence, an appropriate DPDI image can be obtained.

The invention from another aspect for resolving the above problem is an ultrasonic wave imaging method, comprising the steps of calculating a pulsation intensity distribution of an echo source based on the Doppler shift of an echo received from a repetitively transmitted ultrasonic wave, calculating the velocity distribution of the echo source based on the Doppler shift of the echo received from the repetitively transmitted ultrasonic wave, calculating the profile of the velocity distribution, correcting the reflection of the profile, detecting the maximum value of the velocity in the corrected profile, adjusting the repetition frequency of the ultrasonic wave based on the maximum value, and displaying the pulsation intensity distribution as an image.

In the invention from this aspect, the PRF is adjusted based on the maximum value of the velocity distribution profile in which the reflection is corrected. In this way, the PRF is automatically adjusted according to the maximum velocity. The pulsation distribution image acquired by this PRF is displayed. Hence, an appropriate PFD image can be obtained.

According to this invention, a PRF adjustment method and apparatus to obtain an optimum PRF, and ultrasonic wave imaging apparatus comprising such a PRF adjustment apparatus, can be realized.

Further objects and advantages of the present invention will be apparent from the following description of the preferred embodiments of the invention as illustrated in the accompanying drawings.

BRIEF DESCRIPTION OF THE DRAWINGS

FIG. 10 is a schematic view showing a time variation of arterial flow velocity and venous flow velocity.

DETAILED DESCRIPTION OF THE INVENTION

Figure 1:
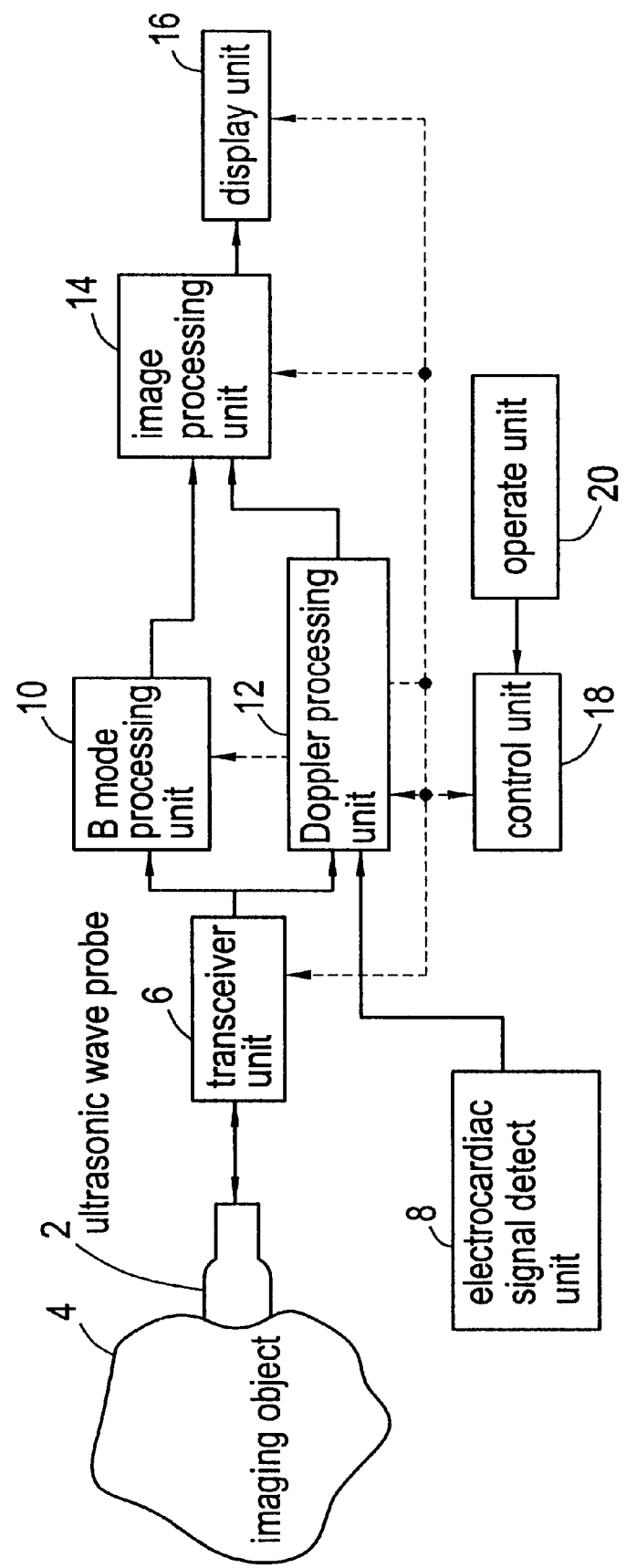
FIG. 1 is a block diagram of one embodiment of this invention.

This invention will now be described in detail referring to the drawings. FIG. 1 shows a block diagram of an ultrasonic wave imaging apparatus. This apparatus is one example of the embodiments of this invention. The construction of this apparatus shows an embodiment related to the apparatus of this invention. The operation of this apparatus shows an embodiment related to the method of this invention.

As shown in FIG. 1, this apparatus comprises an ultrasonic wave probe 2. The ultrasonic wave probe 2 comprises an array of plural ultrasonic wave transducers, not shown. These ultrasonic wave transducers are comprised of a piezoelectric material such as PZT (titanium (Ti) acid-zirconium (Zr) acid-lead) ceramics. The ultrasonic wave probe 2 is used in contact with an imaging object 4.

The ultrasonic wave probe 2 is connected to a transceiver unit 6. The transceiver unit 6 transmits an ultrasonic wave by applying a drive signal to the ultrasonic wave probe 2. The transceiver unit 6 also receives an echo signal received by the ultrasonic wave probe 2.

Figure 2:
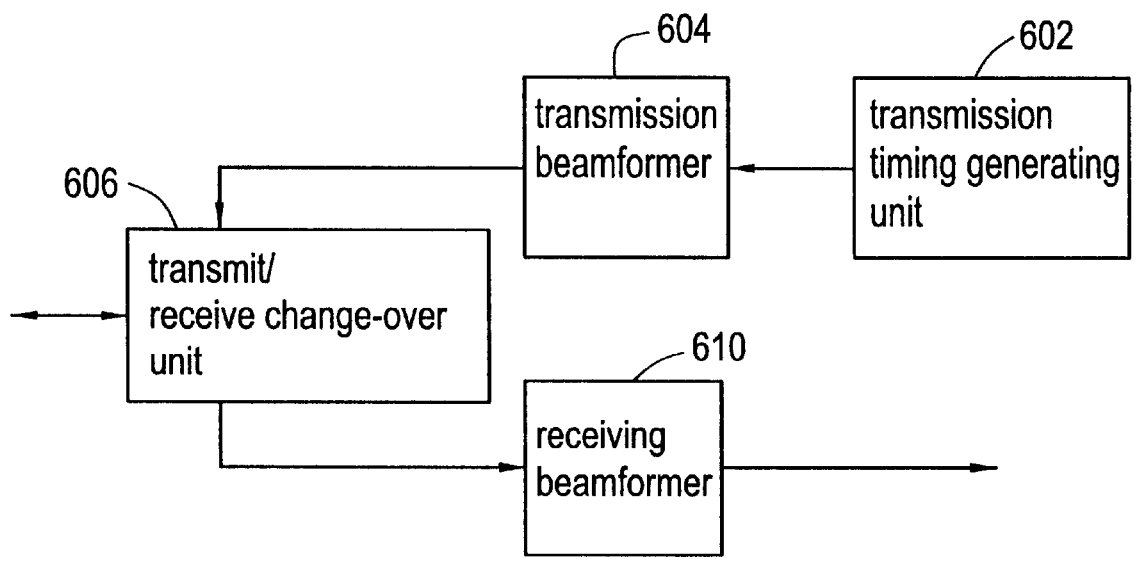
FIG. 2 is a block diagram of a transceiver unit in the apparatus shown in FIG. 1.

A block diagram of the transceiver unit 6 is shown in FIG. 2. As shown in this diagram, the transceiver unit 6 comprises a transmission timing generating unit 602. The transmission timing generating unit 602 periodically generates a transmission timing signal and inputs it to a transmission beamformer 604. The period of the transmission timing signal is controlled by a control unit 18.

The transmission beamformer 604 performs transmission beamforming, and generates a beamforming signal to form an ultrasonic wave beam in a predetermined direction based on the transmission timing signal. The beam forming signal comprises plural drive signals to which a time difference corresponding to the direction has been given. Beamforming is controlled by the control unit 18, described later. The transmission beamformer 604 inputs the transmission beamforming signal to a transmitting/receiving change-over unit 606.

The transmitting/receiving change-over unit 606 inputs the beamforming signal to the ultrasonic wave transducer array. In this ultrasonic wave transducer array, plural ultrasonic wave transducers forming a transmission aperture respectively generate ultrasonic waves having a phase difference corresponding to the time difference of the drive signals. An ultrasonic wave beam is formed along an acoustic line in a predetermined direction by combining the wavefronts of these ultrasonic waves.

The transmitting/receiving change-over unit 606 is connected to a receiving beamformer 610. The transmitting/receiving change-over unit 606 inputs plural echo signals received by a receiving aperture in the ultrasonic wave transducer array to the receiving beamformer 610. The receiving beamformer 610 performs beamforming of the received wave corresponding to the acoustic line of the transmitted wave, adapts the phase by giving a time difference to the plural received echoes, and then adds them to form an echo signal along the acoustic line in the predetermined direction. The beamforming of the received wave is controlled by the control unit 18, described later.

Figure 3:
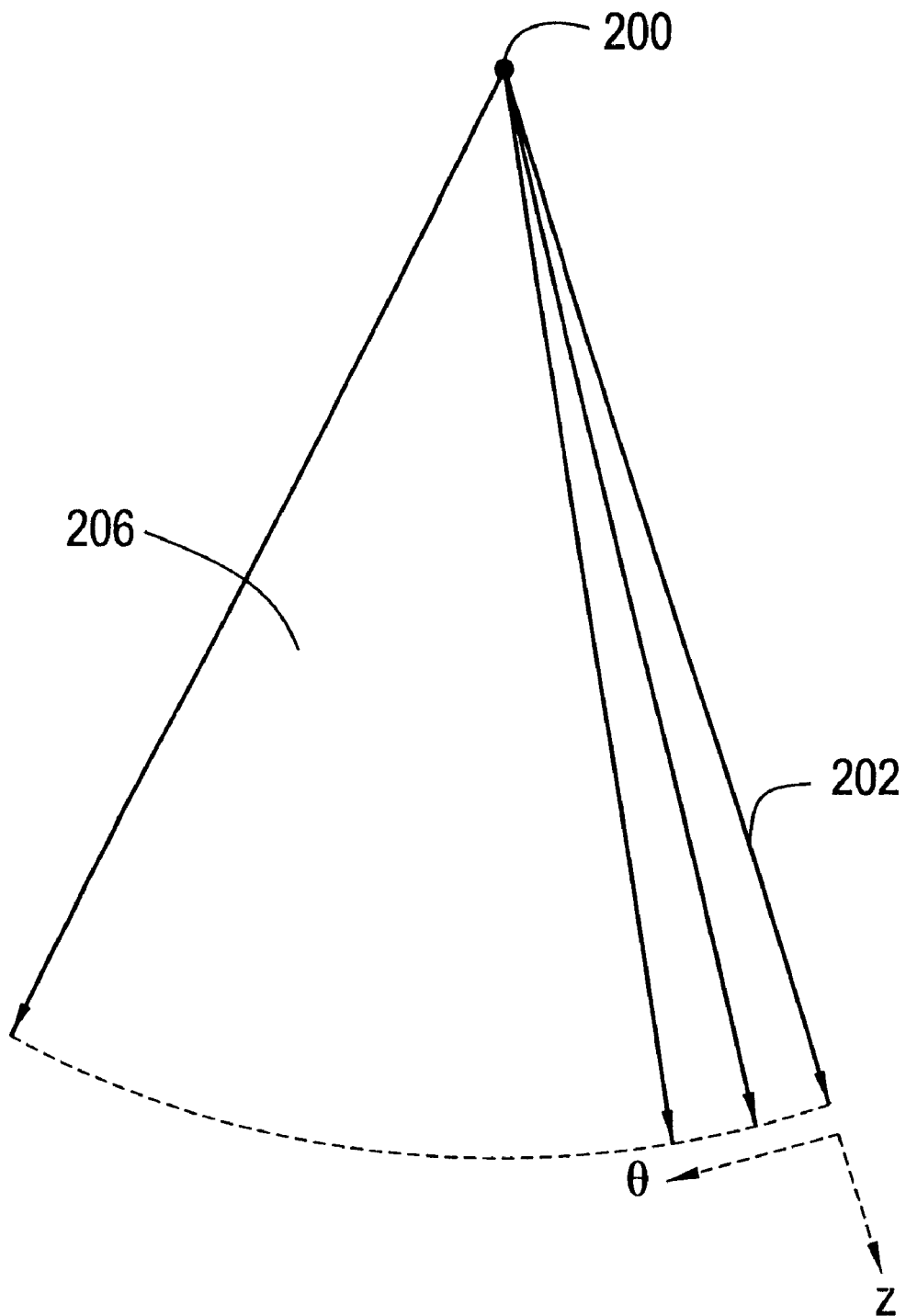
FIG. 3 is a schematic view of an acoustic line scan by the apparatus shown in FIG. 1.

The transmission of the ultrasonic wave beam is repeated a predetermined interval according to the transmission timing signal generated by the transmission timing generating unit 602. Concurrently, the direction of the acoustic line is varied by predetermined amounts by the transmission beamformer 604 and receiving beamformer 610. As a result, the interior of the imaging target 4 is sequentially scanned along the acoustic line. The transceiver unit 6 having this construction performs scanning as shown for example in FIG. 3. Specifically, a so-called sector scan is performed where a fan-shaped two-dimensional region 206 is scanned in a direction θ along an acoustic line 202 which extends from a radial origin 200 in a direction z.

Figure 4:
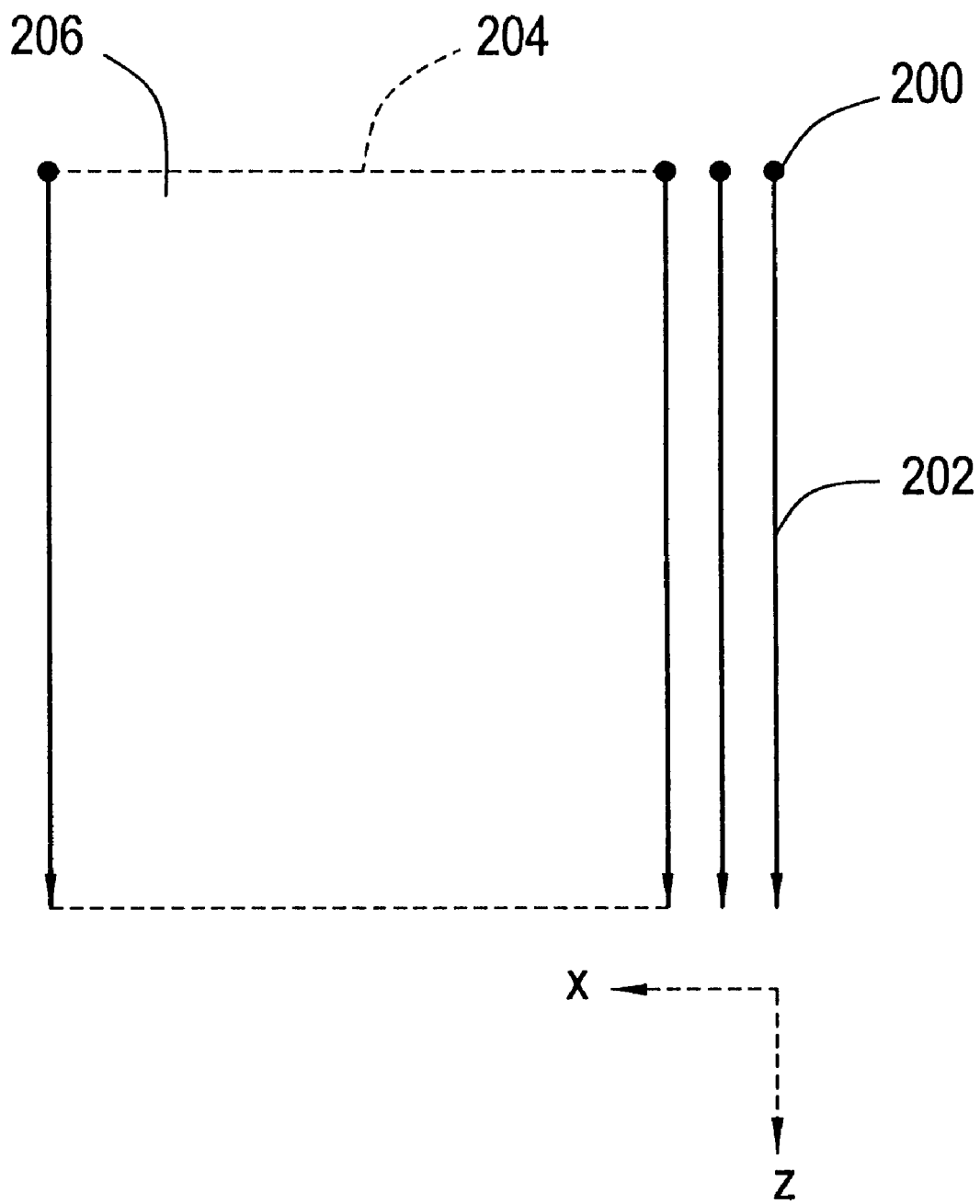
FIG. 4 is a schematic view of an acoustic line scan by the apparatus shown in FIG. 1.

When the transmitting and receiving apertures are formed using part of the ultrasonic wave transducer array, scanning maybe performed as shown in FIG. 4, for example, by sequentially shifting this aperture along the array. Specifically, by moving the acoustic line 202 extending from the radial origin 200 in the direction z along a linear track 204, a so-called linear scan is performed where a rectangular two-dimensional region 206 is scanned in a direction x.

Figure 5:
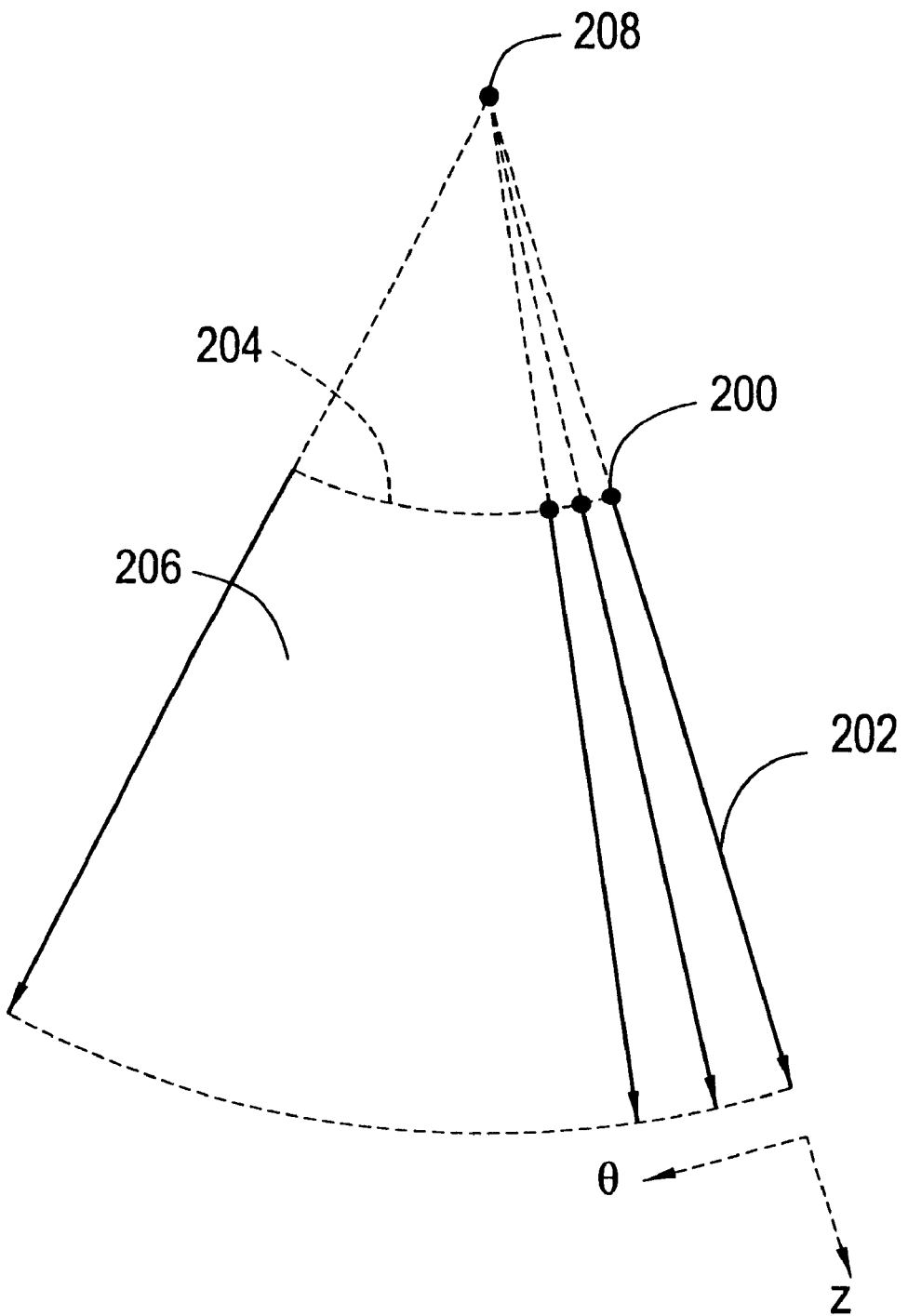
FIG. 5 is a schematic view of an acoustic line scan by the apparatus shown in FIG. 1.

When the ultrasonic wave transducer array is a convex array formed along an arc extending in the ultrasonic wave transmission direction, by scanning the acoustic line in the same way as for a linear scan, the radial origin 200 of the acoustic line 202 is shifted along an arc-shaped track 204, and a so-called convex scan is performed by scanning the fan shaped two-dimensional region 206 in the direction θ, as shown for example in FIG. 5.

The transceiver unit 6 is connected to a B mode processing unit 10 and Doppler processing unit 12. The echo signal for every acoustic line output from the transceiver unit 6 is input to the B mode processing unit 10 and Doppler processing unit 12. An electrocardiac signal detecting unit 8 is connected to the Doppler processing unit 12, an electrocardiac signal from the imaging object 4 being input to this detecting unit.

Figure 6:
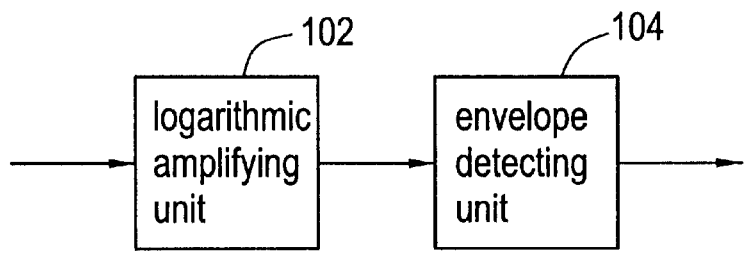
FIG. 6 is a block diagram of a B mode processing unit in the apparatus shown in FIG. 1.

The B mode processing unit 10 forms B mode image data. The B mode processing unit 10 comprises a logarithmic amplifying unit 102 and envelope detecting unit 104, as shown in FIG. 6. The B mode processing unit 10 logarithmically amplifies the echo signal by the logarithmic amplifying unit 102, obtains a signal representing the echo intensity at various reflection points on the acoustic line, i.e., an A scope signal, by performing envelope detection by the envelope detecting unit 104, and forms B mode image data as brightness values of the amplitude at each instant of this A scope signal.

The Doppler processing unit 12 forms Doppler image data. The Doppler image data comprises velocity data, dispersion data, power data, frequency graph data and pulsation intensity data, described later.

Figure 7:
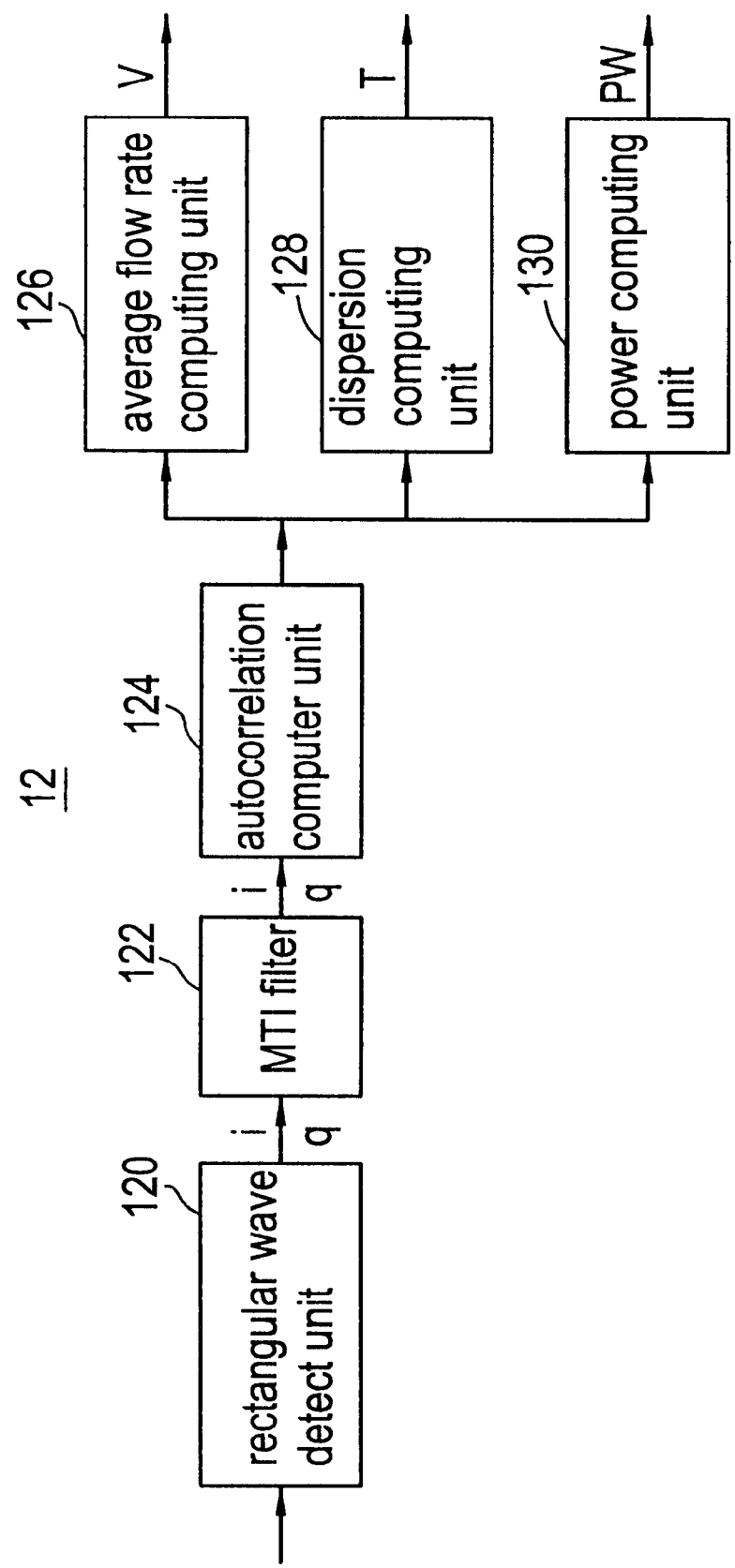
FIG. 7 is a block diagram of part of a Doppler processing unit in the apparatus shown in FIG. 1.

The Doppler processing unit 12 comprises a rectangular wave detecting unit 120, MTI filter (moving target indication filter) 122, autocorrelation computing unit 124, average flow velocity computing unit 126, dispersion computing unit 128 and power computing unit 130, as shown in FIG. 7.

The Doppler processing unit 12 performs rectangular wave detection on the echo signal by the rectangular wave detecting unit 120, and calculates the Doppler shift of the echo signal by performing MTI processing by the MTI filter 122. An autocorrelation computation is performed on the output signal from the MTI filter 122 by the autocorrelation computing unit 24, an average flow velocity V is calculated from the autocorrelation computing result by the average flow velocity computing unit 126, a dispersion T of the flow velocity is calculated from the autocorrelation computing result by the dispersion computing unit 108, and a power PW of the Doppler signal is calculated from the autocorrelation computing result by the power computing unit 130.

In this way, data representing respectively the average flow velocity V, its dispersion T and the power PW of the Doppler signal for an echo source moving inside the imaging object 4, for example blood and the like, are obtained for every acoustic line. This image data shows the average flow velocity, dispersion and power of each pixel on the acoustic line. The velocity is obtained as a component in the acoustic line direction. The directions moving towards and away from the ultrasonic wave probe 2 are also distinguished. The echo source is not limited to blood, and may be a microballoon contrast medium or the like inserted into a blood vessel. The following description refers to blood, but it may equally well be applied to a microballoon contrast medium.

Figure 8:
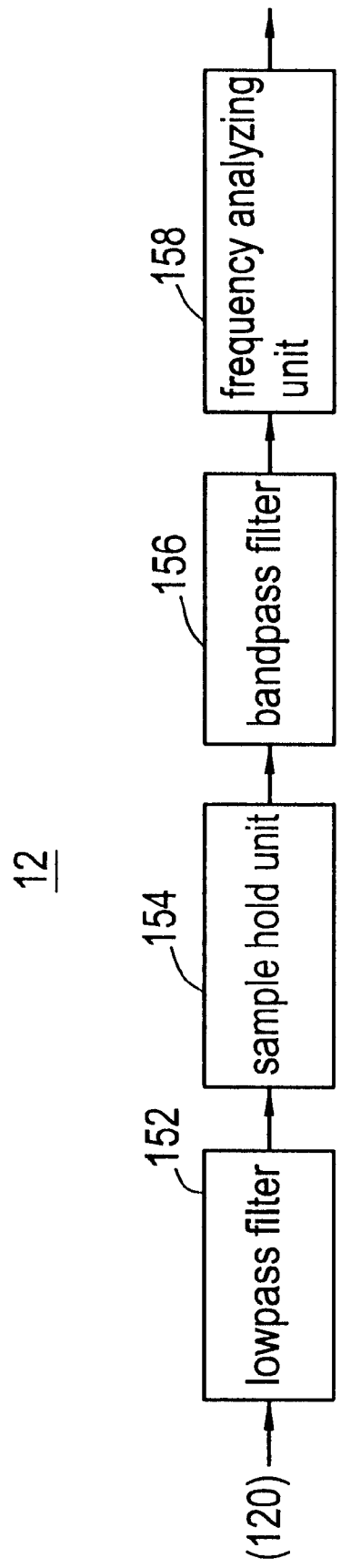
FIG. 8 is a block diagram of part of the Doppler processing unit in the apparatus shown in FIG. 1.

The Doppler processing unit 12 comprises a lowpass filter 152, sample hold unit 154, bandpass filter unit 156 and frequency analyzing unit 158, as shown in. FIG. 8.

The lowpass filter 152 performs lowpass filtering on the output signal from the rectangular wave detecting unit 120. The output signal from the lowpass filter 152 is placed under sample hold according to the position of a sample volume in the imaging object 4, and the sample held signal is subjected to bandpass filtering in the bandpass filter 156. In this way, a signal representing the Doppler shift of the echo in the sample volume, i.e., a point Doppler signal, is obtained. This is frequency analyzed in the frequency analyzing unit 158 to obtain data representing the Doppler shift frequency. Thereafter, the data representing the Doppler shift frequency will be referred to simply as Doppler frequency data.

Figure 9:
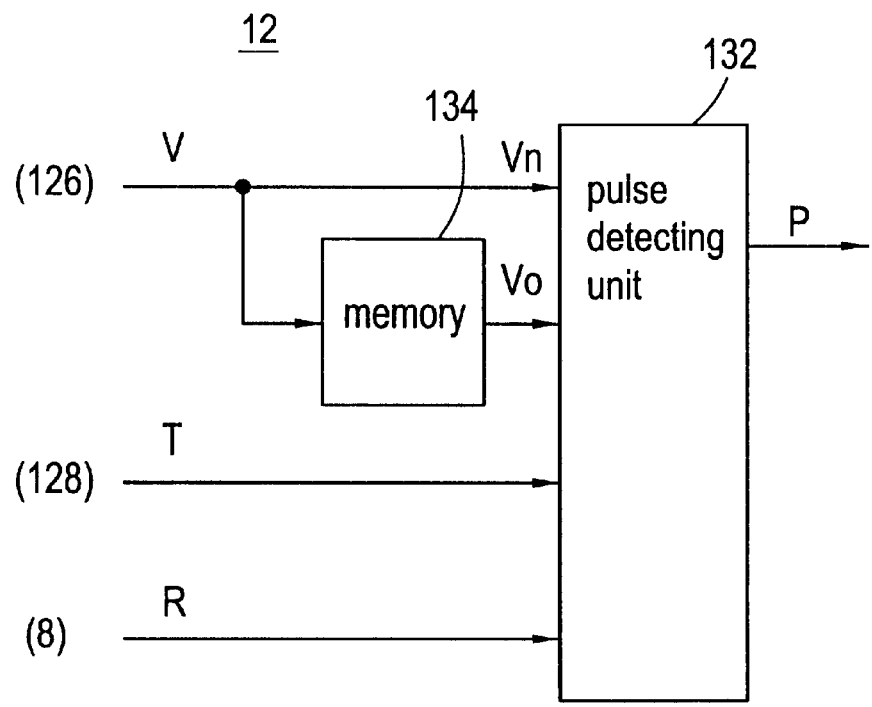
FIG. 9 is a block diagram of part of the Doppler processing unit in the apparatus shown in FIG. 1.

The Doppler processing unit 12 further comprises a pulsation detecting unit 132 and a memory 134, as shown in FIG. 9. The pulsation detecting unit 132 may for example comprise a DSP (digital signal processor) or MPU (microprocessing unit)

The output data from the average flow velocity computing unit 126, i.e., the velocity V, is input for each pixel to the pulsation detecting unit 132 and memory 134. The dispersion T from the dispersion computing unit 128 for each pixel, and an R wave timing signal R of an electrocardiac signal from the electrocardiac signal detecting unit 8, are also input to the pulsation detecting unit 132.

The memory 134 stores one frame of the input velocity data V of acoustic line scanning. From the stored velocity data, the data for the immediately preceding frame relating to identical pixels to the pixels of input velocity data V, are read, and input to the pulsation detecting unit 132. In this way, the velocity data V is input to the pulsation detecting unit 132 with one frame delay via the memory 134.

The memory 134 stores velocity data not just for one frame, but for plural frames, and the data may also be read with a delay of plural frames. Hereafter, the case of one frame delay is taken, but the situation is identical for plural frame delay. Further, the memory 134 is not necessarily a storage device, and may be an extension unit having a delay time corresponding to one frame period to plural frame periods. Hereafter, the case of a memory is described, but the case of an extension unit is identical. One frame period may for example be 1/30 seconds.

The pulsation detecting unit 132 detects the intensity of the pulsation of blood flow velocity based on a computation using velocity data VO and the dispersion T read from the memory 134. A pulsation intensity data P represents the pulsation intensity for every pixel on the acoustic line. The detection of the pulsation intensity is performed as follows.

FIG. 10 schematically shows the velocity variation of blood flow, i.e., the pulsation of blood flow velocity, accompanying the beating of the heart. In this figure, (a) shows an electrocardiac signal, (b) shows arterial blood flow velocity and (c) shows venous blood flow velocity. As shown in (b), the arterial blood flow velocity increases sharply from a time t1 a little after generation of the R wave of the electrocardiac signal, to a time t2. After passing a peak, it rapidly decreases from a time t4 to t5 and then gradually decreases during the remaining time, and this variation is repeated. As shown in (c), the venous flow velocity starts to increase in speed from a time t3 later than the time t2, but the increase in speed is small.

Due to this variation of flow velocity, a velocity data Vn also varies in the same way as (b) or (c). The velocity data VO read from the memory 134 varies in an identical way with a delay of one frame period. Hereafter, the velocity data Vn will be referred to as the current velocity Vn, and the velocity data VO will be referred to as the past velocity VO.

The pulsation detecting unit 132 detects the intensity P of pulsation by the following equation using this input data, $$P = k \cdot |Vn - VO| \quad (1)$$

where k=constant

Figure 11:
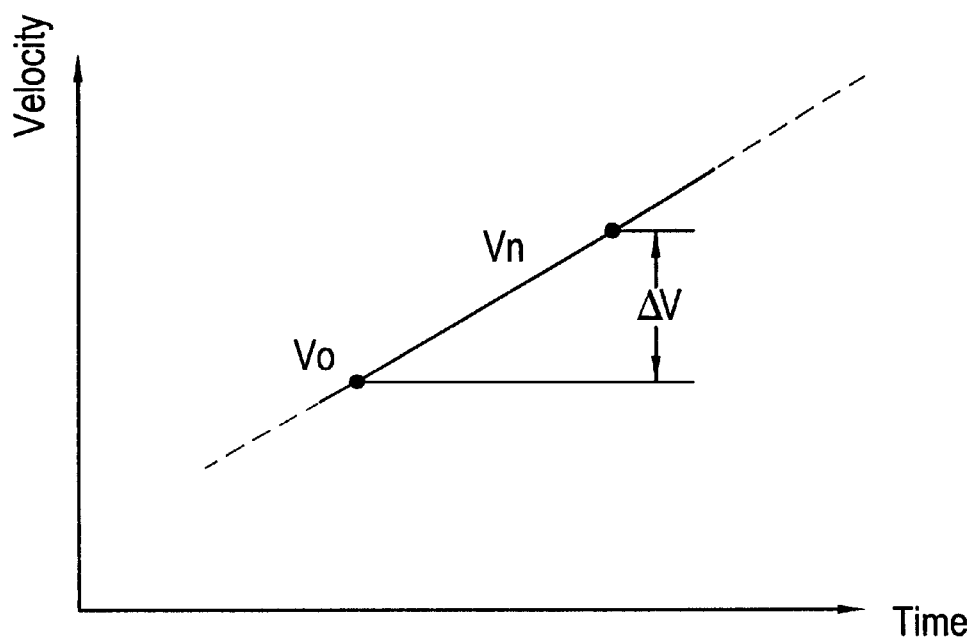
FIG. 11 is a graph describing a pulsation intensity.

In other words, the pulsation intensity (pulsation characteristic) is detected based on the difference between the current velocity Vn and the past velocity VO, as shown in FIG. 11. The pulsation characteristic is larger the larger a difference value ΔV.

Alternatively, the difference value ΔV may be divided by the current velocity Vn, and the pulsation characteristic detected by the following equation:

$$P = m \cdot |Vn - VO| / Vn \quad (2)$$

Where m=constant.

Figure 12:
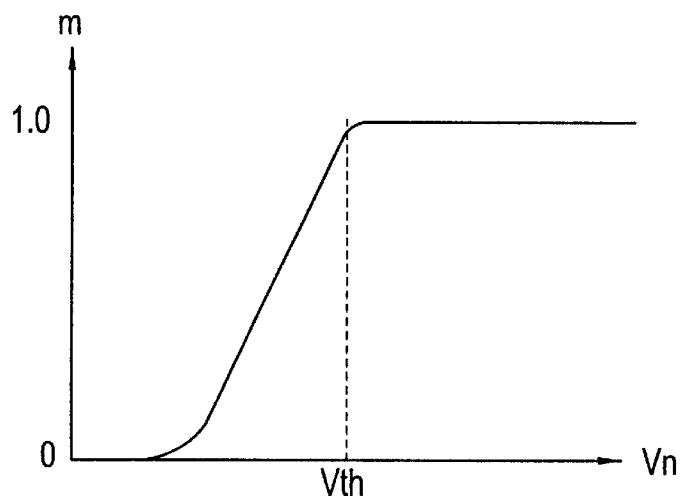
FIG. 12 is a graph showing typical characteristics of a constant m.
Figure 13:
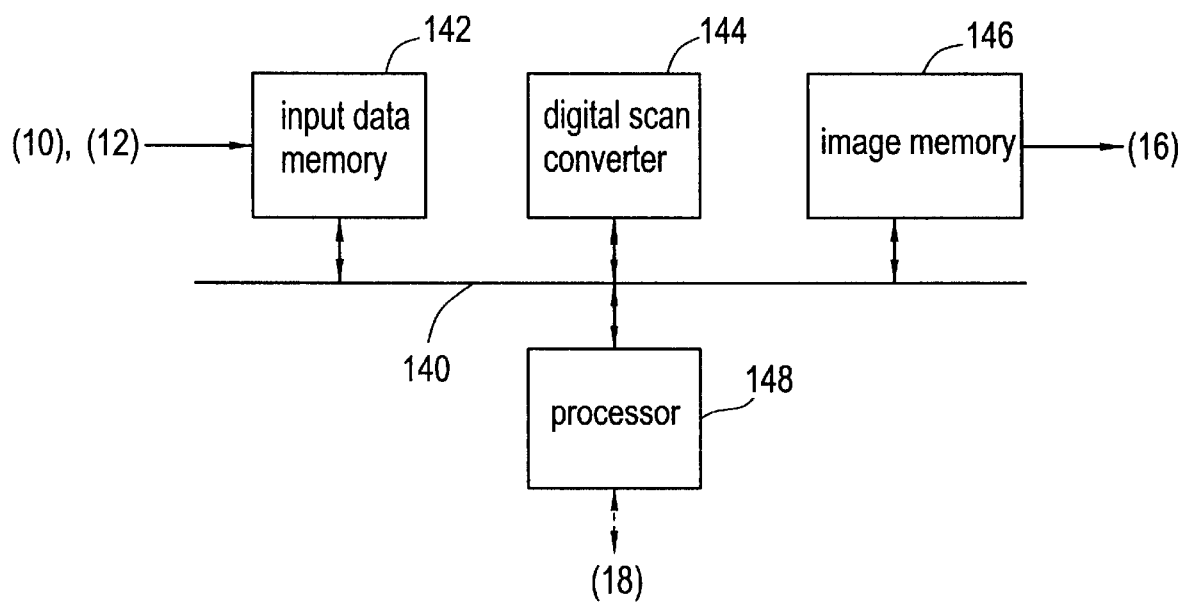
FIG. 13 is a block diagram of an image processing unit in the apparatus shown in FIG. 1.

If equation (2) is used, the pulsation characteristic can be expressed by normalizing which is convenient. The constant m may be a variable constant which varies according to the current velocity Vn, as shown for example in FIG. 12, and it may be weighted according to the current velocity Vn. In other words, for velocities below a predetermined value Vth, the weighting is decreased by reducing the value of the constant m. In this way, the sensitivity of pulsation detection to venous blood flow which is generally slower, can be reduced, and pulsation detection of arterial blood flow can be performed without fail. The characteristic curve of the variable constant m is not limited to that shown in the figure, and may be set as desired.

The pulsation detecting unit 132, in addition to the computation of the above equation, performs detection of the pulsation characteristic by referring to the dispersion value T. For arterial blood flow, the velocity dispersion is larger than for venous blood flow, so a highly reliable pulsation characteristic detection can be performed by looking up the dispersion value T. Specifically, even if the value of P is large in the equations (1) or (2) for example, when the dispersion T is small, the value of P is correspondingly reduced, and excessive pulsation characteristic detection is suppressed.

The B mode processing unit 10 and Doppler processing unit 12 are connected to an image processing unit 14. The image processing unit 14 forms a B mode image, Doppler image, pulsation intensity image and Doppler frequency image based on data respectively input from the B mode processing unit 10 and Doppler processing unit 12.

The part comprising the ultrasonic wave probe 2, transceiver unit 6, Doppler processing unit 12 and image processing unit 14 is one embodiment of the velocity distribution calculating means according to this invention. It is also an embodiment of the power distribution calculating means. Further, it is an embodiment of the pulsation intensity distribution calculating means.

The image processing unit 14 comprises an input data memory 142, a digital scan converter 144, an image memory 146 and a processor 148 connected by a bus 140.

B mode image data and Doppler image data input for the every acoustic line from the B mode processing unit 10 and Doppler processing unit 12, are respectively stored in the input data memory 142. The data in the input data memory 142 are scan converted by the digital scan converter 144, and stored in the image memory 146. The processor 148 performs predetermined data processing respectively on the data from the input data memory 142 and the image memory 146. The specific details of the data processing will be described later.

A display unit 16 is connected to the image processing unit 14. The display unit 16 is one embodiment of the display means according to this invention. The display unit 16 receives an image signal from the image processing unit 14, and displays an image based thereon. The display unit 16 comprises, for example, a graphic display which can display colours.

The control unit 18 is connected to the aforesaid transceiver unit 6, B mode processing unit 10, Doppler processing unit 12, image processing unit 14 and display unit 16. The control unit 18 controls the operation of these units by supplying control signals to them. Various information signals are also input from these controlled units.

Under the control of the control unit 18, B mode operation and Doppler mode operation are performed. An operating unit 20 is connected to the control unit 18. The operating unit 20 is operated by an operator, and inputs various commands and information to the control unit 18. The operating unit 20 comprises, for example, a keyboard, a pointing device, and a control panel comprising other operating tools.

The operation of this apparatus will now be described. The operator brings the ultrasonic wave probe 2 in contact with a predetermined position of the imaging object 4, operates the operating unit 20, and for example performs an imaging operation using the B mode and Doppler mode in conjunction. As a result, B mode imaging and Doppler mode imaging are performed by time division. For example, mixed B mode/Doppler mode scanning is performed wherein a B mode scan is performed once when a Doppler mode scan is performed a predetermined number of times.

In the B mode, the transceiver unit 6 scans the inside of the imaging object 4 sequentially along the acoustic line via the ultrasonic wave probe 2, and receives echoes one by one. The B modeprocessing unit 10 logarithmically amplifies the echo signal input from the transceiver unit 6 by the logarithmic amplifying unit 102, calculates an A scope signal by performing envelope detection by the envelope detecting unit 104, and B mode image data is formed for the whole acoustic line based thereon. The image processing unit 14 stores the B mode image data for every acoustic line input from the B mode processing unit 10 in the input data memory 142. As a result, an acoustic line data space for the B mode image data is formed in the input data memory 142.

In the Doppler mode, the transceiver unit 6 scans the inside of the imaging object 4 sequentially along the acoustic line via the ultrasonic wave probe 2, and receives echoes one by one. In this process, transmission of plural ultrasonic waves and reception of echoes occurs plural times on each acoustic line. The repetition frequency of transmission/reception on the same acoustic line is the PRF. When imaging starts, a previously provided default value is used as the PRF.

The Doppler processing unit 12 performs rectangular wave detection on the echo signal by the rectangular wave detecting unit 120, MTI processes the signal by the MTI filter 122, calculates an autocorrelation by the autocorrelation computing unit 124, calculates an average flow velocity from the autocorrelation result by the average flow velocity computing unit 126, calculates a dispersion by the dispersion computing unit 128, and calculates a power by the power computing unit 130. The pulsation intensity is also calculated as described above by the pulsation detecting unit 132. These computed values, for example the average velocity of blood flow and its dispersion, the power of the Doppler signal and the pulsation characteristic of the blood flow, become image data for every acoustic line and every pixel.

The Doppler processing unit 12 comprises the lowpass filter 152, sample hold unit 154, bandpass filter 156 and frequency analyzing unit 158, and calculates Doppler frequency data for the sample volume.

The image processing unit 14 stores Doppler image data and Doppler frequency data for every acoustic line and every pixel input from the Doppler processing unit 12, in the input data memory 142. In this way, an acoustic line data space and a Doppler frequency data space for Doppler image data are respectively formed in the input data memory 142.

The processor 148 respectively scan converts the B mode image data, Doppler image data and Doppler frequency data in the input data memory 142 by the digital scan converter 144, and writes it to the image memory 146. In this process, the Doppler image data is written in the form of CFM data wherein dispersion is added to velocity, power Doppler (PDI) image data and pulsation intensity (PFD) image data. The PDI image data is given directionality according to the polarity of the Doppler shift. This PDI image is specifically referred to as DPDI (directional power Doppler imaging).

The PFD image data may also be written as CFM similar image data wherein the velocity is added to the pulsation intensity. It may also be written as PDI similar image data wherein PDI image data is added to the pulsation intensity. Doppler frequency data is written as coordinates on a graph having frequency as the vertical axis and time as the horizontal axis.

The processor 148 writes the B mode image data, CFM image data, DPDI image data, pulsation intensity image data and Doppler frequency data in separate regions. The B mode image shows a tomogram of body structures on the acoustic line scanning surface. The CFM image shows a two-dimensional distribution of blood flow velocity or the like on the acoustic line scanning surface. In this image, the display color is different according to the direction of blood flow. The brightness of the display color is also different according to the velocity. The purity of the display color is also varied by increasing the blending ratio of predetermined colors according to the dispersion.

The DPDI image shows the presence and direction of blood flow on the acoustic line scanning surface. In the DPDI image, two display colors are used to distinguish the direction of blood flow. The display color is different from the color used for the CFM image. The brightness of the display color is varied according to the signal intensity.

The pulsation intensity image shows a two-dimensional distribution of pulsation intensity of blood flow or the like on the acoustic line scanning surface. The pulsation intensity image is displayed in one color. The display color is made different from the color used for the CFM image or PDI image. The brightness of the display color is varied according to the pulsation intensity.

When a pulsation intensity image is formed as a CFM image or PDI image, the purity of the display color of velocity or power is varied according to the pulsation intensity. The colors which are blended are however varied to make a clear distinction from dispersion.

When these images are displayed on the display unit 16, the B mode image and CFM image are for example superimposed. In this way, a blood flow velocity distribution image having a clear positional relationship to body structures can be observed. Alternatively, the B mode image and DPDI image may be superimposed. In this case, a blood vessel running state having a clear positional relationship to body structures can be observed.

The B mode image and pulsation intensity image may be superimposed. In this case, an arterial running state having a clear positional relationship to body structures can be observed. Thus, it can be seen at a glance whether or not blood vessels are arterial in nature. In particular, when a CFM similar image or PDI similar image is displayed, the velocity distribution and its pulsation characteristic or the distribution of a flowing echo source and the velocity pulsation characteristic can be seen at a glance.

The graph which shows the time variation of the Doppler frequency is displayed alongside the aforesaid images on the same screen if necessary. As a result, the time variation of Doppler frequency in the sample volume can be observed.

Figure 14:
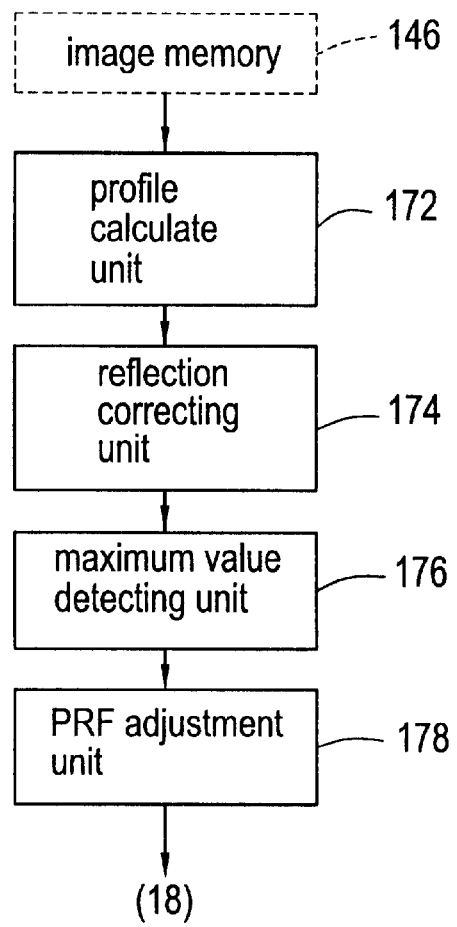
FIG. 14 is a block diagram of a processor in the image processing unit shown in FIG. 13.

FIG. 14 shows a block diagram of the processor 148 from the viewpoint of PRF adjustment. Each block in this diagram maybe implemented by, for example, a computer program. As shown in the figure, the processor 148 comprises a profile calculating unit 172. The profile calculating unit 172 reads a CFM image from the input data memory 142 or image memory 146, and calculates its profile. The profile calculating unit 172 is one embodiment of the profile calculating means according to this invention.

Figure 15:
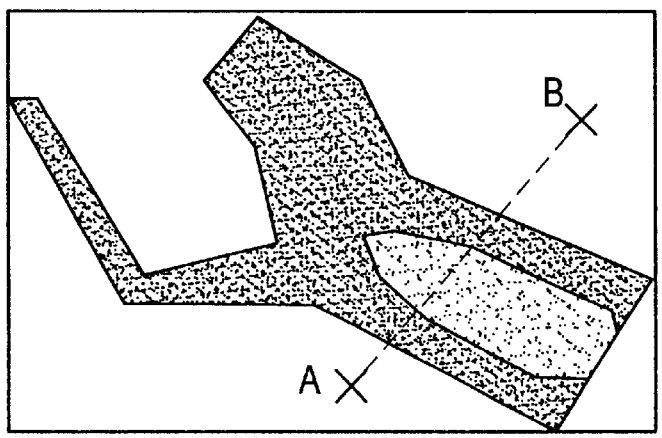
FIG. 15 is a schematic view of a CFM image.

The positions at which the profile is calculated are specified by the operator on the display screen. Specifically, if a CFM image such as is shown in FIG. 15 is displayed, for example, a straight line joining two points A, B is specified as a position for calculating the profile by specifying the two points A, B by a pointing device or the like on the screen.

Figure 16:
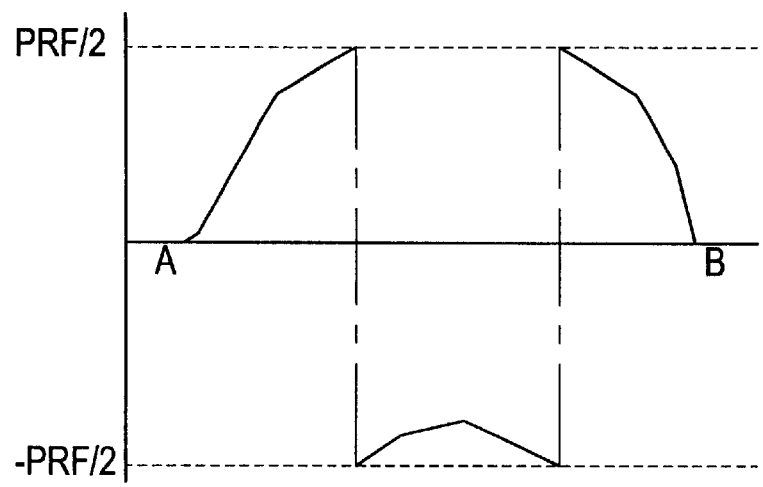
FIG. 16 is a diagram describing the action of the processor shown in FIG. 14.

The profile calculating unit 172 calculates a one-dimensional profile of the CFM image along the line AB, i.e. a flow velocity distribution on the line AB. Hence, a profile such as is shown in FIG. 16 for example can be obtained. The profile shown in this figure corresponds to the case when the PRF does not match the highest blood flow velocity, and in the flow velocity converted to a Doppler frequency, a part exceeding a frequency corresponding to 1/2 of the PRF is reflected from the –PRF/2 side. In the CFM of FIG. 15 comprising this reflection, the blood flow direction is displayed partly inverted, so the correct blood flow state is not displayed.

Figure 17:
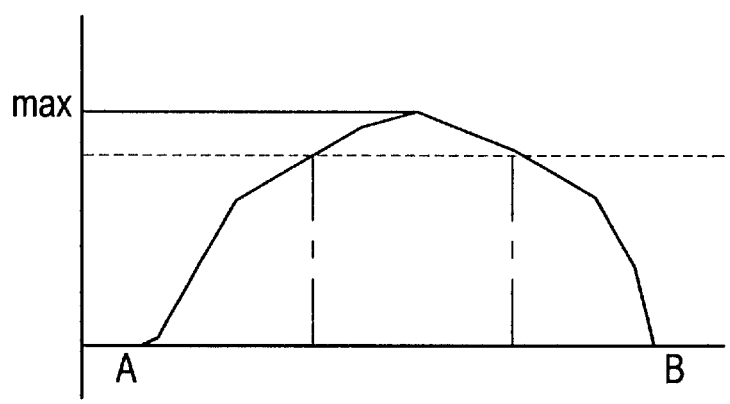
FIG. 17 is a diagram describing the action of the processor shown in FIG. 14.

The profile is input to a reflection correcting unit 174. The correcting unit 174 is an embodiment of the reflection correcting means according to this invention. The reflection correcting unit 174 examines whether or not there is a reflection in the profile, and performs a correction where there is a reflection. The reflection maybe detected from the fact that the data on the line AB changes from + to – or from – to + without passing through 0. At these places, the reflection is corrected by adding values corresponding to the PRF to the data. As a result, a profile such as is shown in FIG. 17 is obtained.

Figure 18:
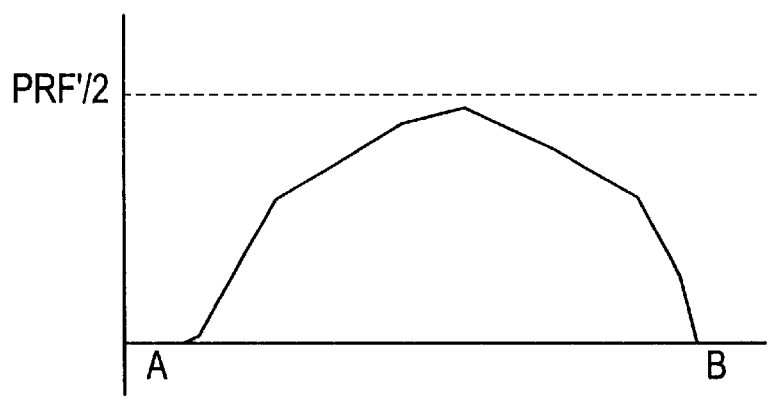
FIG. 18 is a diagram describing the action of the processor shown in FIG. 14.

The profile in which reflection has been corrected is input to a maximum value detecting unit 176. The maximum value detecting unit 176 inputs a maximum value max for the input profile to a PRF adjustment unit 178. The PRF adjustment unit 178 determines a new PRF based on the input maximum value max. The new PRF is determined for example by values exceeding the maximum value max of the profile. As a result, the new PRF' shown in FIG. 18, for example, is obtained.

The maximum value detecting unit 176 is an embodiment of the maximum value detecting means according to this invention. The PRF adjustment unit 178 is an.embodiment of the repetition frequency adjusting means according to this invention.

The new PRF' is input to the control unit 18. The control unit 18 sets the new PRF' in the transceiver unit 6, and repeats ultrasonic wave transmission/reception based thereon. As a result, an ultrasonic wave is transmitted and received at a repetition frequency matching the highest blood flow velocity, and a correct CFM image without any.inversion in the directional display can be obtained.

Figure 19:
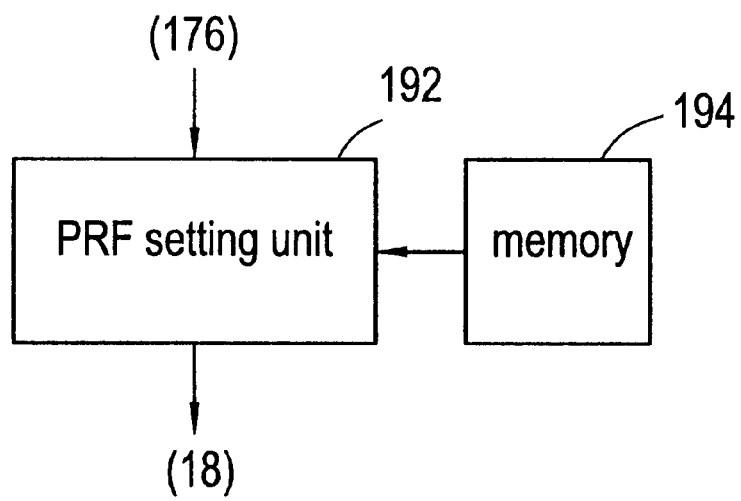
FIG. 19 is a block diagram of part of the processor shown in FIG. 14.

The PRF adjustment unit 178 may comprise a PRF selecting unit 192 and a memory 194, as shown for example in FIG. 19. Plural PRF of different values are prestored in the memory 194. Of the plural PRF stored in the memory, the PRF selecting unit 192 selects a PRF having a value nearest the maximum value max input from the maximum value detecting unit 176. The PRF selecting unit 192 is an embodiment of the repetition frequency selecting means according to this invention.

In the selection, the value which is nearest to and which exceeds the maximum value max is selected. Alternatively, the nearest value to the maximum value max is selected regardless of its magnitude. In this case, a PRF less than the maximum value max may be selected, and it may be more convenient in some cases to allow a small amount of reflection depending on the purpose of the observation. A value nearest to and less than the maximum value max may be selected for this purpose. The selection scheme which is adopted is set by the operator beforehand via the operating unit 20.

Figure 20:
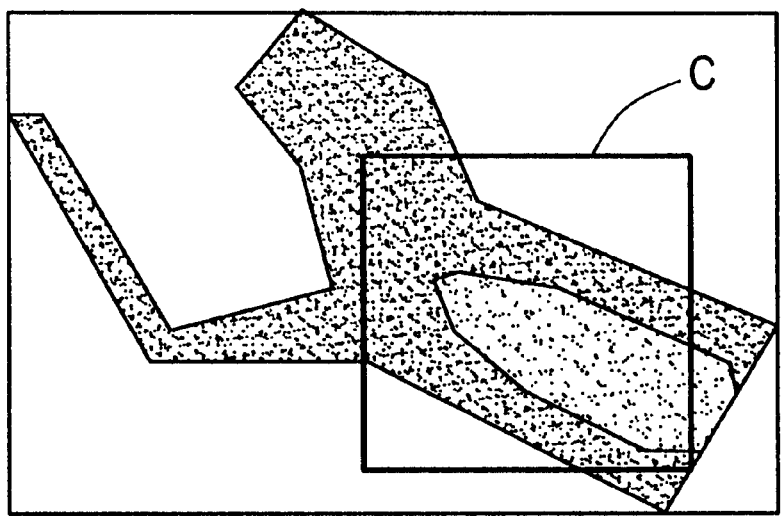
FIG. 20 is a schematic view of a CFM image.

Instead of specifying the positions where the profile is calculated by the line AB, a two-dimensional area C may be specified as shown for example in FIG. 20. When the area C is specified, the profile calculating unit 172 calculates a two-dimensional profile for the area C.

The reflection correcting unit 174 performs detection and correction of the reflection part of the two-dimensional profile, the maximum value detecting unit 176 calculates the maximum value max for the two-dimensional profile after correction, and the PRF adjustment unit 178 calculates the maximum value of the PRF based thereon. When the area C is specified in this way, the maximum value max inside this area is calculated, so the RF can be adjusted to a more suitable value for obtaining the CFM image.

The above operation may be performed not only for a CFM image, but also for a DPDI image or PFD image. For a DPDI image or PFD image, the CFM image forming a pair with these is stored in the image memory 146. Thus, when the profile calculating position is specified by the line AB or the area C for a DPDI image or PFD image on the display screen, a profile at the same position is calculated for the corresponding CFM image. Thereafter, the optimum PRF is calculated in the same way. Hence, a highly precise DPDI image or PFD image is obtained from the optimum PRF.

The PRF calculated as described above may be used to determine a point Doppler PRF. However, as the flow velocity represented by the CFM image is an average flow velocity, the PRF adjusted on this basis will be adapted to the maximum value of the average flow velocity. On the other hand, with the point Doppler, the Doppler frequency of the instantaneous flow velocity is displayed. There is approximately two times difference between the average flow velocity and the instantaneous flow velocity. Hence, a value twice that of the PRF calculated as described above is taken as the point Doppler PRF. In this way, PRF adjustment of the point Doppler can also be automated.

Many widely different embodiments of the invention may be configured without departing from the spirit and the scope of the present invention. It should be understood that the present invention is not limited to the specific embodiments described in the specification, except as defined in the appended claims.

What is claimed is:

1. An ultrasonic wave imaging apparatus comprising:

velocity distribution calculating means which calculates the velocity distribution of an echo source based on the Doppler shift of an echo received from a repetitively transmitted ultrasonic wave;

profile calculating means which calculates the profile of said velocity distribution, reflection correcting means which corrects the reflection of said profile;

maximum value detecting means which detects the maximum value of the velocity in said corrected profile;

repetition frequency adjusting means which adjusts the repetition frequency of said ultrasonic wave based on said maximum value; and display means which displays said velocity distribution as an image.

2. The ultrasonic wave imaging apparatus of claim 1, wherein said reflection correcting means corrects using a value corresponding to a step in the profile in a reflection part.

3. The apparatus of claim 1, wherein said profile calculating means calculates a one-dimensional profile.

4. The apparatus of claim 1, wherein said profile calculating means calculates a two-dimensional profile.

5. The apparatus of claim 1, wherein said repetition frequency adjustment means comprises repetition frequency selection means which selects a frequency neares the Doppler shift frequency corresponding to said maximum value from predetermined plural frequencies as said repetition frequency.

6. The apparatus of claim 5, wherein said repetition frequency selection means selects the nearest frequency from frequencies exceeding said Doppler shift frequency corresponding to said maximum value.

7. The apparatus of claim 5, wherein said repetition frequency selection means selects the nearest frequency from frequencies not exceeeding said Doppler shift frequency corresponding to said maximum value.

8. The apparatus of claim 1, further comprising power distribution calculating means which calculates a power distribution of a Doppler signal based on the Doppler shift of the echo received from the repetitively transmitted ultrasonic wave; and wherein said display means diplays said power distribution as an image.

9. The apparatus of claim 8, wherein said reflection correcting menas corrects using a value corresponding to a step in the profile of a reflection part.

10. The apparatus of claim 8, wherein said display means displays said power by distinguishing the Dopper shift direction.

11. An ultrasonic wave imaging apparatus comprising:

a pulsation intensity distribution calculating means which calculates a pulsation intensity distribution of an echo source based on the Doppler shift of an echo received from a repetitively transmitted ultrasonic wave;

velocity distribution calculating means which calculates the velocity distribution of the echo source based on the Doppler shift of the echo received from the repetitively transmitted ultrasonic wave;

calculating means which calculates the profile of said velocity distribution;

reflection correcting means which corrects the reflection of said profile;

maximum value detecting means which detects the maximum value of the velocity in said corrected profile;

repetition frequency adjusting means which adjusts the repetition frequency of said ultrasonic wave based on said maximum value; and display means which displays said pulsation intensity distribution as an image.

12. The ultrasonic wave imaging apparatus of claim 11, wherein said reflection correcting means corrects using a value corresponding to a step in the profile of a reflection part.

13. The ultrasonic wave imaging apparatus of claim 11, wherein said display means displays said velocity distribution alongside said pulsation intensity distribution.

14. The ultrasonic wave imaging apparatus of claim 1, wherein said profile calculating means calculates a one-dimensional profile.

15. The ultrasonic wave imaging apparatus of claim 1, wherein said profile transmitting means calculates a two-dimensional profile.

16. The ultrasonic wave imaging apparatus of claim 1, wherein said repetition frequency adjustment means comprises repetition frequency selection means which selects a frequency nearest the Doppler shift frequency corresponding to said maximum value from predetermined plural frequencies as said repetition frequency.

17. The ultrasonic wave imaging apparatus of claim 16, wherein said repetition frequency selecting means selects the nearest frequency from frequencies exceeding said Doppler shift frequency corresponding to said maximum value.

18. The ultrasonic wave imaging apparatus of claim 16, wherein said repetition frequency selecting means selects the nearest frequency from frequencies not exceeding said Doppler shift frequency corresponding to said maximum value.

19. A PRF adjustment method comprising the steps of:

storing in a memory a plurality of repetitive frequencies;

calculating the velocity distribution of an echo source based on the Doppler shift of an echo received from a repetitively transmitted ultrasonic wave;

calculating the profile of said velocity distribution;

correcting the reflection of said profile;

detecting the maximum value of the velocity in said corrected profile; and selecting from said plurality of repetitive frequencies stored in said memory the nearest value of repetitive frequency to said maximum value so that a desired amount of reflection is provided in said profile.

20. The method of claim 19, wherein the correction of said reflection is performed using a value corresponding to a step in the profile in a reflection part.

21. The method of claim 19, wherein said profile is a one-dimensional profile.

22. The method of claim 19, wherein said profile is a two-dimensional profile.

23. The method of claim 19, wherein said rearest value of repetitive frequency is nearest the Doppler shift frequency corresponding to said maximum value.

24. The method of claim 23, wherein said nearest value of repetitive frequency is selected from frequencies exceeding said Doppler shift frequency corresponding to said maximum value.

25. The method of claim 23, wherein said nearest value of repetitive frequency is selected from frequencies not exceeding said Doppler shift frequency corresponding to said maximum value.

26. A PRF adjustment apparatus comprising:

memory means for priorly storing a plurality of repetitive frequencies;

velocity distribution calculating means which calculates the velocity distribution of an echo source based on the Doppler shift of an echo received from a repetitively transmitted ultrasonic wave;

profile calculating means for calculating the profile of said velocity distribution;

reflection correcting means which corrects the reflection of said profile;

maximum value detecting means which detects the maximum value of the velocity in said corrected profile; and selecting means for selecting from said plurality of repetitive frequencies stored in said memory the nearest value of repetitive frequency to said maximum value so that a desired amount of reflection is provided in said profile.

27. The apparatus of claim 26, wherein said reflection correcting means corrects using a value corresponding to a step in a reflection part.

28. The apparatus of claim 26, wherein said profile calculating means calculates a one-dimensional profile.

29. The apparatus of claim 26, wherein said selecting means selects the nearest frequency exceeding said Doppler shift frequency corresponding to said maximum value.

30. The apparatus of claim 26, wherein said selecting means selects the nearest frequency not exceeding said Doppler shift frequency corresponding to said maximum value.

31. The apparatus of claim 26, wherein said profile calculating means calculates a two-dimensional profile.

32. The apparatus of claim 26, wherein said selecting means selects a frequency nearest the Doppler shift frequency corresponding to said maximum value from predetermined plural frequencies as said repetition frequency.

* * * * *